United States Patent [19]

Dujardin et al.

[11] Patent Number: 4,929,709
[45] Date of Patent: May 29, 1990

[54] POLYCARBONATE CONTAINING ARALKYLPHENYL END GROUPS

[75] Inventors: Ralf Dujardin; Rolf-Volker Meyer, both of Krefeld; Wolfgang Siebourg, Bonn, all of Fed. Rep. of Germany

[73] Assignee: Bayer Aktiengesellschaft, Bayerwerk, Fed. Rep. of Germany

[21] Appl. No.: 301,690

[22] Filed: Jan. 25, 1989

[30] Foreign Application Priority Data

Feb. 10, 1988 [DE] Fed. Rep. of Germany ....... 3803939

[51] Int. Cl.$^5$ ............................................. C08G 63/62
[52] U.S. Cl. ....................................... 528/198; 528/20; 528/126; 528/202; 528/204
[58] Field of Search ................. 528/198, 202, 204, 20, 528/126

[56] References Cited

U.S. PATENT DOCUMENTS

| | | | |
|---|---|---|---|
| 3,028,365 | 4/1962 | Schnell et al. | 260/47 |
| 3,085,992 | 4/1963 | Lee et al. | 260/47 |
| 3,399,172 | 8/1968 | Jaquiss | 260/47 |
| 4,111,910 | 9/1978 | Baggett | 528/196 |
| 4,221,645 | 9/1980 | Adelmann et al. | 204/159.14 |
| 4,230,548 | 10/1980 | Adelmann et al. | 204/159.14 |
| 4,269,964 | 5/1981 | Freitag et al. | 528/126 |
| 4,677,184 | 6/1987 | Mark | 528/198 |

FOREIGN PATENT DOCUMENTS 51-34992 3/1976 Japan .

OTHER PUBLICATIONS

K. D. Bode in Huben-Weyl, "Methoden der organischen Chemie", vol. 6/1c, Phenole, Part 2, pp. 925 et seq, Thieme Verlag 1976.

Primary Examiner—Harold D. Anderson
Attorney, Agent, or Firm—Joseph C. Gil; Aron Preis

[57] ABSTRACT

This invention relates to thermoplastic, aromatic polycarbonates prepared with the aid of chain terminating agents corresponding to formula (I)

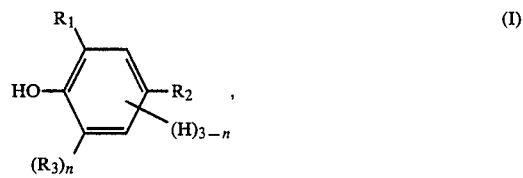

to a process for the preparation of these polycarbonates and to their use for the production of moulded articles for optical purposes.

7 Claims, No Drawings

POLYCARBONATE CONTAINING ARALKYLPHENYL END GROUPS

This invention relates to thermoplastic, aromatic polycarbonates having average molecular weights $\overline{M}n$ (number average determined by gel chromatography after calibration) of at least 5000 g/mol, preferably from 7500 to 100,000 g/mol, especially from 9000 to 25,000 g/mol, based on diphenols, chain terminating agents and optionally branching agents, characterised in that the chain breaking agents correspond to formula (I)

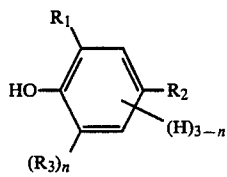

wherein $R_1$, $R_2$ and $R_3$ are identical or different and stand for $C_2$–$C_{12}$–alkyl or $C_8$–$C_{20}$–aralkyl, and Ar preferably stands for phenyl, diphenyl or naphthyl, and at least one of the groups denoted by $R_1$ or $R_2$ is a $C_8$–$C_{20}$–aralkyl group, and "n" has a value from 0.5 to 1, preferably from 0.6 to 0.9.

The chain terminating agents corresponding to formula (I) to be used according to the invention may be individual compounds but are generally mixtures of compounds. They are either known in the literature or may be prepared by methods known in the literature, for example by the alkylation of phenols (see, for example, K.D. Bode in Houben-Weyl, "Methoden der organischen Chemie", Vol.6/1c, Phenole, Part 2, pages 925 et seq, Thieme Verlag 1976).

The present invention further relates to the use of the aralkylphenols of formula (I) as chain terminating agents for the preparation of thermoplastic, aromatic polycarbonates.

The invention further relates to the preparation of thermoplastic aromatic polycarbonates having molecular weights $\overline{M}n$ (number average, determined as described above) of at least 5000 g/mol, preferably from 7500 to 100,000 g/mol, especially from 9000 to 25,000 g/mol, by the known two-phase interface process, the known process in homogeneous solution (the so-called pyridine process) or the known solvent-free transesterification process carried out by the reaction of reactive carbonic acid derivatives with diphenols, chain terminating agents and optionally branching agents, characterised in that the chain breaking agents used are phenols corresponding to formula (I).

The present invention further relates to the thermoplastic aromatic polycarbonates obtainable by the process according to the invention.

Owing to their advantageous properties, especially their good flow properties, the polycarbonates according to the invention are suitable for the production of moulded parts of great dimensional accuracy such as is required especially for optical apparatus such as data stores or audio compact discs.

The invention thus also relates to the use of the aromatic thermoplastic polycarbonates according to the invention for the production of moulded articles for optical purposes such as data stores or audio compact discs.

A wide variety of chain terminating agents has already been used for the preparation of polycarbonates (see, for example, U.S. Pat. No. 3,085,992, U.S. Pat. No. 3,399,172, U.S. Pat. No. 3,028,365, U.S. Pat. No. 4,111,910, EP-OS 0 001 579, EP-OS 0 006 579, U.S. Pat. No. 4,677,184, JP-OS 34992/76 and DE-OS 2 842 005). Phenols and alkylphenols are the most commonly used.

One important factor in choosing chain terminating agents for polycarbonates is the relationship of the molecular weight and the mechanical properties on the one hand to the rheological properties and processibility on the other. If the molecular weight is low, the rheological properties and processibility are advantageous but the mechanical properties of the polycarbonate are in many cases no longer optimal. If the molecular weight is high, the mechanical properties are suitable but processing is more difficult.

The use of the chain terminating agents corresponding to formula (I) is surprisingly found to produce an advantageous combination of mechanical properties and rheological properties for a given molecular weight.

Examples of compounds corresponding to the general formula (I) which are suitable for the purpose of this invention include reaction products of phenol and styrene, phenol and α-methylstyrene, phenol and p-methylstyrene, p-isooctylphenol and styrene, dodecylphenol mixtures with styrene, phenol with styrene and ethylene, phenol with isobutene and styrene, etc.

Determination of the average molecular weight of the commercial arylalkylphenol mixtures of the general formula (I) used for the process is carried out by determining the OH number by known methods. The OH number is a measurement which indicates how many milligrams of potassium hydroxide are equivalent to the quantity of acetic acid which is bound by 1 g of the substance by acetylation. There are well known methods for determining the OH number, e.g. as described by E.Schröder, G.Müller and K.-F.Arndt in "Leitfaden der Polymercharakterisierung", pages 23 et seq (Akademie Verlag Berlin 1982).

The average molecular weight ($\overline{M}w$) of the commercial mixtures of the general formula I used in the process is thus carried out in accordance with the following well known formula:

$$Mw = \frac{5.6 \cdot 10^4}{OH\ number}\ (g \cdot mol^{-1})$$

The OH number of the arylalkylphenol mixtures of the general formula (I) used for the process is in the range of from 67 to 248, preferably from 100 to 185. The OH numbers mentioned correspond to average molecular weights of the compounds of from 226 to 836 g/mol the preferred range being from 303 to 560 g/mol.

The quantity of chain terminating agent of formula (I) for adjusting the molecular weight $\overline{M}n$ to values of from 5000 g/mol to 100,000 g/mol is well known to be from 0.5 mol-% to 10 mol-%, preferably from 2 mol-% to 7 mol-%, based on the number of mols of diphenols put into the process.

If, in addition, branching agents, i.e. trifunctional or higher than trifunctional compounds, are used in the usual quantities of from 0.05 mol-% to 2 mol-%, based on the mols of diphenols, then the quantity of chain breaking agents of formula (I) is from 0.5 mol-% to 10 mol-%, preferably from 3 mol-% to 6 mol-%.

The diphenols suitable for this invention may be either mononuclear or polynuclear and they may contain hetero atoms and/or may in addition be substituted, preferably with halogen or alkyl, especially chlorine, bromine, methyl or ethyl.

The diphenols used according to the invention preferably correspond to the formula (II)

HO—Z—OH, wherein Z denotes a divalent aromatic group containing 6 to 30 carbon atoms which may be unsubstituted or substituted by halogen, for example, chlorine or bromine, or by alkyl, for example methyl or ethyl.

The following are suitable diphenols:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones,
α,α'-bis-(hydroxyphenyl)-diisopropylbenzenes and
α,ω-bis-(hydroxyphenyl)-polysiloxane
and the corresponding compounds which are alkylated or halogenated in the nucleus. These and other suitable diphenols are described, for example, in U.S. Patent Specifications Nos. 3 028 365, 2 999 835, 3 148 172, 2 991 273, 3 271 367 and 2 999 846, in German Offenlegungsschriften Nos. 1 570 703, 2 063 050, 2 036 052 and 2 211 956, in French Patent Specification No. 1 561 518, in European Specification EP-O-122 535 and in the monograph "H.Schnell, Chemistry and Physics of Polycarbonates, Interscience Publishers, New York, 1964".

The following are examples of preferred diphenols:
4,4'-dihydroxydiphenyl,
2,2-bis-(4-hydroxyphenyl)-propane,
2,4-bis-(4-hydroxyphenyl)-2 -methylbutane,
1,1-bis-(4-hydroxyphenyl)-cyclohexane,
α,α'-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane.
α,α'-bis-(3,5-dimethyl-4-hydroxyphenyl)-p-diisopropylbenzene,
2,2-bis-(3,5-dichloro-4-hydroxyphenyl)-propane,
2,2-bis-(3,5-dibromo-4-hydroxyphenyl)-propane and those corresponding to formula IIa:

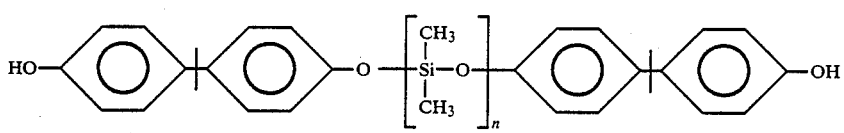

wherein n = 40, 60, 80 or 100.

The following are examples of particularly preferred diphenols:
2,2-Bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane.

Any mixtures of the above-mentioned diphenols may also be used.

Carbonyl halides and the bishalogen formates of the diphenols used are carbonic acid derivatives which are reactive under the conditions of polycarbonate preparation, both by the phaseinterface process and by the process in homogeneous solution. Phosgene and the bis-chloroformates are preferred, especially phosgene.

Carbonic acid derivatives which are reactive for the solvent-free transesterification process include diarylcarbonates, especially diphenylcarbonate and the bisarylcarbonates of the diphenols used. Diphenyl carbonate is preferred for the solvent-free transesterification process.

In the case of the phase interface process and the process in homogeneous solution, the quantity of carbonic acid derivative to be used is from 1 mol to 2 mols per mol of diphenol, the quantity of bishalogen formates used being from 0.5 mol to 1 mol per mol of diphenol.

For the solvent-free transesterification process, the quantity of carbonic acid derivative is from 1.0 mol to 2.5 mol per mol of diphenol and the quantity of bisarylcarbonates required is from 1.0 mol to 1.5 mol per mol of diphenol.

Branching agents suitable for the purpose of this invention, i.e. compounds which are trifunctional or higher than trifunctional, the term "functional" denoting the reactivity under the conditions of the process of polycarbonate preparation, include in particular compounds containing three or more than three phenolic OH groups.

The following are some examples of suitable compounds containing three or more than three phenolic hydroxyl groups: Phloroglucinol; 4,6-dimethyl-2,4,6-tri-(4-hydroxyphenyl)-heptene-2; 4,6-dimethyl-2,4,6-tri-(4-hydroxyphenyl)heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-[4-(4-hydroxyphenylisopropyl)-phenyl]-ortho-terephthalic acid ester; tetra-(4-hydroxyphenyl)-methane; tetra[4-(4-hydroxyphenyl-isopropyl)-phenoxy]-methane and 1,4-bis-[(4',4''-dihydroxy-triphenyl)-methyl]-benzene. The following are further examples of trifunctional compounds: 2,4-dihydroxybenzoic acid, trimesic acid, cyanuric chloride and 3,3-bis-(3-methyl-4-hydroxyphenyl)-2-oxo-2,3-dihydroindole.

The reaction conditions for the various methods of polycarbonate preparation suitable for the invention, i.e. reaction temperatures, reaction pressures, solvents if used, catalysts, reaction times, concentrations of the reactants to be observed in any solvents used, quantities of catalyst, nature and quantity of basic compounds, etc.

are well known and are applicable to the known conditions.

The apparatus, reaction vessels, stirrers, etc. to be used are also well known.

Preparation of the polycarbonates according to the invention is preferably carried out by the phase interface process (see H.Schnell, "Chemistry and Physics of Polycarbonates", Polymer Reviews, Vol.IX, pages 33 et seq. Interscience Publ., (1964)).

This process is generally carried out as follows: The diphenols, preferably corresponding to formula (II), are dissolved in an aqueous alkaline phase. The chainbreaking agents corresponding to formula (I) required for the preparation of the polycarbonates according to the invention are added in quantities of from 0.5 to 10 mol-%, preferably from 2 to 7 mol-%, based on the mols of diphehols.

The reaction with phosgene is then carried out by the method of phase interface condensation at reaction temperatures of from 0° to 40° C. after the addition of an inert organic phase which preferably acts as solvent for the polycarbonate.

For this procedure, the compounds of formula (I) are required to be readily soluble in the aqueous alkaline medium. The compounds of formula (I) have a comparable solubility and reactivity to the phenols conventionally used as end groups, e.g. phenol, p-tert.-butylphenol and p-isooctylphenol. This is all the more surprising in view of the fact that even 2,6-di-tert.-butyl-substituted phenols are insoluble in the aqueous alkaline medium (K.Findeisen in Houben-Weyl, "Methoden der organischen Chemie", Vol. 6/1c, pages 1196 et seq, Thieme Verlag 1976).

Solubility was not to be expected in view of the high proportion of 2,4,6-trisubstituted phenols in the mixture of chain terminating agents corresponding to formula (I) (n > 0.5 denotes more than 50% of trisubstituted compounds). The suitability of compounds of formula (I) as chain terminating agents for the synthesis of polycarbonates by the phase interface process was therefore not foreseeable.

The optionally used branching agents added in quantities of from 0.05 to 2 mol-%, based on the quantity of diphenols put into the process, may either be introduced into the aqueous alkaline phase together with the diphenols and the chain terminating agents of formula (I) or added as a solution in an organic solvent before phosgenation is carried out.

Instead of the diphenols, their mono- and/or bis-chlorocarbonic acid esters may be used, dissolved in organic solvents. The quantity of chain terminating agents of formula (I) and of branching agents depends on the mols of diphenolate structural units, which means the O-Z-O- structural units when diphenols of formula (II) are used.

When chlorocarbonic acid esters are used, the quantity of phosgene may be correspondingly reduced in known manner.

The chain terminating agents of formula (I) to be used according to the invention may also be added in solution during phosgenation. Suitable organic solvents for dissolving the chain terminating agents of formula (I) and optionally for dissolving the branching agents and chlorocarbonic acid esters include, for example, methylene chloride, chlorobenzene, acetonitrile and mixtures of these solvents, especially mixtures of methylene chloride and chlorobenzene.

Methylene chloride, chlorobenzene and mixtures of methylene chloride and chlorobenzene are examples of substances which may be used as the organic phase for phase interphase polycondensation.

The preparation of the polycarbonates according to the invention by the phase interface process may be catalysed in conventional manner by means of catalysts such as tertiary amines, in particular tertiary aliphatic amines such as tributylamine or triethyleneamine. The catalysts may be used in quantities of from 0.05 to 10 mol-%, based on the mols of diphenols used or the mols of diphenolate structural units. The catalysts may be added before phosgenation is begun or during or after phosgenation.

Isolation of the polycarbonates according to the invention is carried out in known manner, for example by evaporating off the separated and washed solution of the polycarbonate in the organic solvent in an evaporation extruder, followed by extrusion and granulation of the polycarbonate in known manner.

Compared, for example, with corresponding polycarbonates which are terminated with phenol, p-tert.-butylphenol or 4-isooctylphenol, the polycarbonates according to the invention have a substantially improved fluidity at comparable average molecular weights.

The polycarbonates according to the invention can be thermoplastically processed in conventional manner at temperatures of from 260° to 320° C. Any moulded articles or sheets can be produced in known manner by injection moulding or by extrusion.

The polycarbonates according to the invention are readily soluble in solvents such as chlorinated hydrocarbons, e.g. methylene chloride, and may be worked up in known manner, for example to produce cast sheets.

Conventional additives such as age resistors against the action of UV light, against oxygen or against the action of moisture, and flame-retardants, and processing auxiliaries such as lubricants, mould release agents and plasticizers, as well as fillers, may be added to the polycarbonates according to the invention.

For example, carbon black, kieselguhr, kaolin, clay, $CaF_2$, $CaCO_3$, aluminium oxides, glass fibres and inorganic pigments as well as fillers and nucleating agents may be added to the polycarbonates according to the invention.

Glycine tristearate, trimethylolpropane tristearate, pentaerythritol tetrastearate and the corresponding palmitic acid esters and myristic acid esters are examples of suitable mould release agents.

In the following Examples, $n_{rel}$ is determined in $CH_2Cl_2$ at 25° C. and at a concentration of 0.5% by weight.

EXAMPLE 1

4.56 kg of bisphenol A dissolved in 8 kg of 45% sodium hydroxide solution and 40 kg of water are introduced into a reaction vessel at 20° C. together with 20 kg of methylene chloride and 20 kg of chlorobenzene. 295.3 g $\hat{=}$ 4 mol-%, based on bisphenol A. of a commercial mixture of 2,4-di- and 2,4,6-tri-(1-phenylethyl)-phenol (OH number 150) are introduced into the stirred mixture and 2.7 kg of phosgene are then introduced over a period of one hour at pH 13-14 and at 21-25° C. 28 ml of N-ethylpiperidine are then added and stirring is continued for one hour.

The aqueous phase which is free from bisphenolate is separated and the organic phase is washed with water until neutral after acidification with phosphoric acid and is freed from solvent. The polycarbonate is found to have a relative solution viscosity of $n_{rel} = 1.263$.

EXAMPLE 2

A polycarbonate containing 329.84 g $\hat{=}$ 4 mol-% of a commercial mixture of 2,4-di- and 2,4,6-tri-(1-methyl-1-phenylethyl)-phenol (OH number 136) was prepared as described in Example 1. $n_{rel} = 1.274$.

EXAMPLE 3

A polycarbonate containing 668.66 g $\hat{=}$ 4 mol-% of a commercial mixture of the 2.4- and 2,4,6-position isomers of the products of alkylation of phenol with isobutene and styrene (OH number 67) was prepared as described in Example 1. $n_{rel} = 1.278$.

COMPARISON EXPERIMENTS A–C

Polycarbonates containing in each case 4 mol-% of one of the following chain terminating agents were prepared as described in Example 1:

| Comparison Example | Chain terminating agent | (g) | $\eta_{rel}$ | OH number |
|---|---|---|---|---|
| A | p-tert.-butylphenol | 120 | 1.267 | 373 |
| B | phenol | 75 | 1.261 | 596 |
| C | p-iso-octylphenol | 165 | 1.270 | 272 |

The average molecular weights ($\overline{M}_n$) determined by gel permeation chromatography after calibration and the melt viscosities ($N_{melt}$) determined with a Contraves-Rheomat 30 at 320° C. and a shear stress of $\tau = 10^3$ Pa are shown in Table 1 for Examples 1–3 and Comparison Experiments A–C.

| Example | $\overline{M}_n$ (kg/mol) | $\eta_{melt}$ (Pas) |
|---|---|---|
| 1 | 12.5 | 240 |
| 2 | 12.7 | 265 |
| 3 | 12.5 | 255 |
| A | 12.8 | 310 |
| B | 12.2 | 315 |
| C | 12.6 | 295 |

We claim:

1. Thermoplastic, aromatic polycarbonate having a number average molecular weights $\overline{M}_n$ (number average determined by gel chromatography after calibration) of at least 5000 g/mol based on diphenols, chain terminating agents and optionally branching agents, characterised in that the chain terminating agent correspond to formula (I)

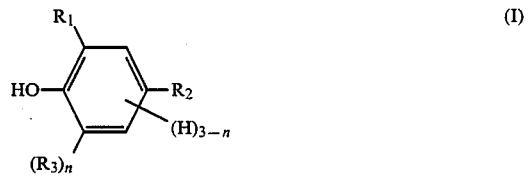

where $R_1$, $R_2$ and $R_3$ are identical or different and stand for $C_2$–$C_{12}$-alkyl or $C_8$–$C_{20}$-aralkyl, at least one of the groups $R_1$ or $R_2$ being a $C_8$–$C_{20}$-aralkyl group and "n" having a value of from 0.5 to 1.

2. The polycarbonate according to claim 1, characterised in that "n" in the chain terminating agent of formula (I) has a value of from 0.6 to 0.9.

3. The polycarbonate according to claim 1, characterised in that the aralkyl groups of the chain terminating agent of formula (I), Ar stands for phenyl, diphenyl or naphthyl.

4. Polycarbonate according to claim 1 having average molecular weights ($\overline{M}_n$) of from 7500 g/mol to 100,000 g/mol.

5. A thermoplastic aromatic polycarbonate resin having a number average molecular weight of at least 5000 gram/mole comprising the reaction product of either the two phase interface process, the homogeneous solution process or the solvent free transesterification process, in which a carbonic acid derivative is reacted with at least one diphenol and at least one chain terminating agent corresponding to formula (I) of claim 1.

6. A molded article for optical applications comprising the polycarbonate of claim 1.

7. Data storage disc comprising the polycarbonate of claim 1.

* * * * *